United States Patent [19]
Chang

[11] Patent Number: 5,469,961
[45] Date of Patent: Nov. 28, 1995

[54] COMBINED MINIDISC BOX

[76] Inventor: Chun Y. Chang, 3 Floor-1, No. 65, Sec. 3, Roosevelt Rd., Taipei, Taiwan

[21] Appl. No.: 290,138
[22] Filed: Aug. 15, 1994
[51] Int. Cl.⁶ ............................. B65D 85/30; B65D 83/57
[52] U.S. Cl. .......................... 206/312; 206/309; 206/89.1; 206/81.13; 206/509; 220/23.4; 220/23.6; 220/4.27
[58] Field of Search .................................. 206/312, 307, 206/309, 387, 449, 509, 511, 512; 220/23.4, 23.6, 4.27

[56] References Cited

U.S. PATENT DOCUMENTS

| 3,899,229 | 8/1975 | Ackeret | 312/319 |
|---|---|---|---|
| 4,431,237 | 2/1984 | Saito et al. | 312/9 |
| 4,519,655 | 5/1985 | Kamperman | 312/12 |
| 4,828,341 | 5/1989 | Bohnet et al. | 312/12 |
| 4,889,254 | 12/1989 | Vola | 220/23.4 |
| 5,191,983 | 3/1993 | Hardy | 211/40 |

Primary Examiner—Steven N. Meyers
Assistant Examiner—Tara L. Laster

[57] ABSTRACT

This invention relates to a combined minidisc box, especially a kind of combined minidisc box which can be connected with each other with its left, right, top and bottom sides. The combined minidisc box comprising an upper case and a lower case, wherein the lower case having flanges which can be fitted with grooves of the upper case, two sides of the upper case having respectively a continuous interval dovetails and dovetail slots. Each dovetail and dovetail slots of one side being faced to each dovetail slots and dovetail of the other side, at the top of the upper case having fitting holes and the bottom having fitting posts. The two continuous interval dovetails and dovetail slots of the combined minidisc box can be fitted and connected respectively with continuous interval dovetail slots and dovetails of other combined minidisc boxes. The fitting holes and the fitting posts of the combined minidisc box can furthermore be fitted and connected respectively with fitting posts and fitting holes of other combined minidisc boxes, therefore the combined minidisc box can be connected with each other on its left, right, top and bottom sides.

1 Claim, 4 Drawing Sheets

COMBINED MINIDISC BOX

BACKGROUND OF THE INVENTION

This invention relates to a combined minidisc box, especially a combined minidisc box which can be connected with each other on its left, right, top and bottom sides.

The conventional CD boxes are manufactured into standard dimension, but there is not any minidisc box appeared in the market for minidisc. In Europe countries and America, the minidisc box has been developed and manufactured recently, but such kind of minidisc box can not be connected with each other by user, supersonic wave oscillation is the only way to connect these minidisc boxes.

SUMMARY OF THIS INVENTION

It is therefore the main object of this invention to provide a combined mindisc box which having continuous interval dovetails and dovetail slots formed at its two sides, at the top of the minidisc box having fitting holes and the bottom having fitting posts so as to make the combined minidisc box can be connected with other combined minidisc boxes on its left, right, top and bottom sides.

BRIEF DESCRIPTION OF THE DRAWINGS

In the drawings, which illustrate the preferred embodiment and mode of operation of the invention, and in which like reference characters designate the same or similar parts throughout the several views.

DETAILED DESCRIPTION OF THE PREFERRED EMBODIMENT

Figure 1:
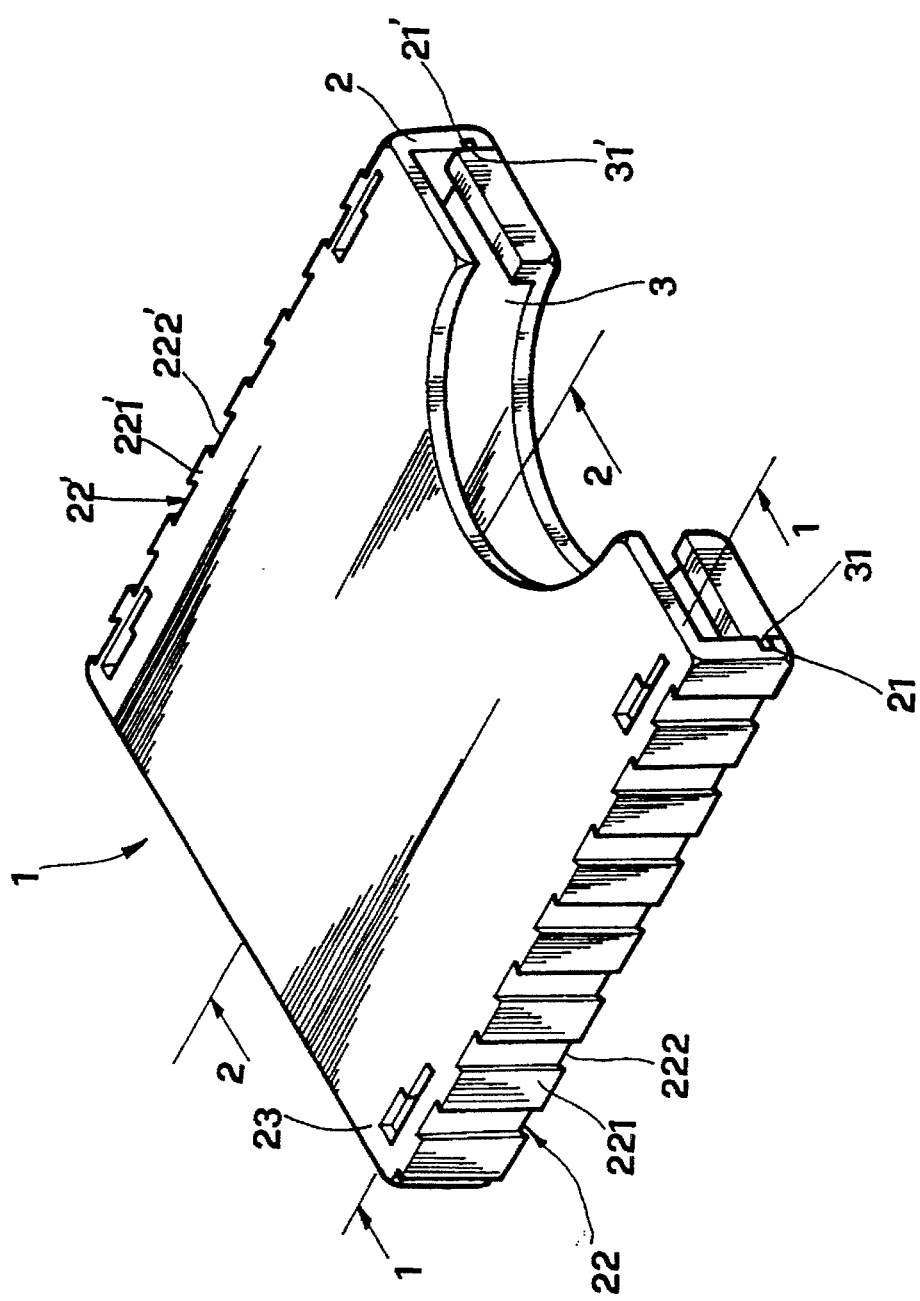
FIG. 1 is a perspective view showing the combined minidisc box of the present invention.
Figure 3:
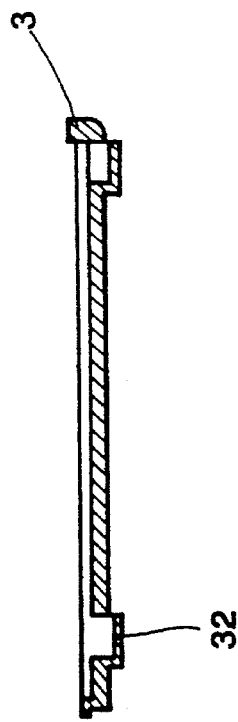
FIG. 3 is a sectional view showing the lower case of this invention on line A—A of the FIG. 1.
Figure 4:
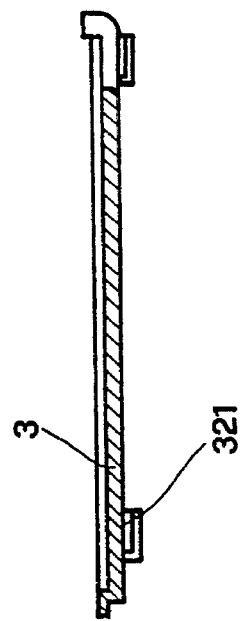
FIG. 4 is a sectional view showing the upper case of this invention on line B—B of the FIG. 1.
Figure 2:
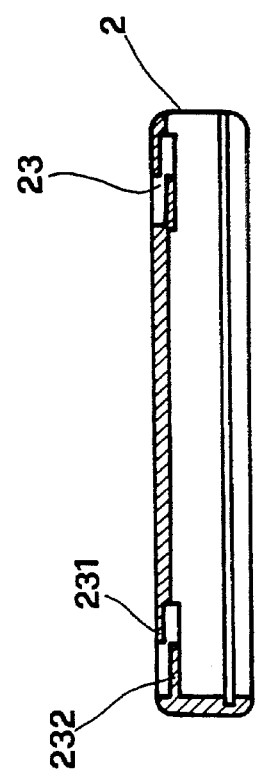
FIG. 2 is a sectional view showing the upper case of this invention on line A—A of the FIG. 1.

Referring to FIG. 1 to FIG. 4, the present invention, combined mindisc box (1) comprises an upper case (2) and lower case (3); wherein the upper case (2) having grooves (21) (21') formed at its two inner sides, the two outer sides of the upper case (2) having connecting parts (22) (22') which are composed of continuous interval dovetails and dovetail slots (221) (222) and (221') (222'), furthermore the dovetails (221) and dovetail slots (222) being faced respectively to the dovetail slots (222') and dovetails (221'), the upper case (2) having fitting holes (23) formed at its four corners which having respectively a first fixing plate (231) and a second fixing plate (232).

The lower case (3) have flanges (31) (31') formed at its two inner sides at the bottom of the lower case (3) having fitting posts (32) which are situated oppositely to the fitting holes (23) of the upper case (2), furthermore each fitting post (32) having a concave part (321) formed at its front part.

Figure 6:
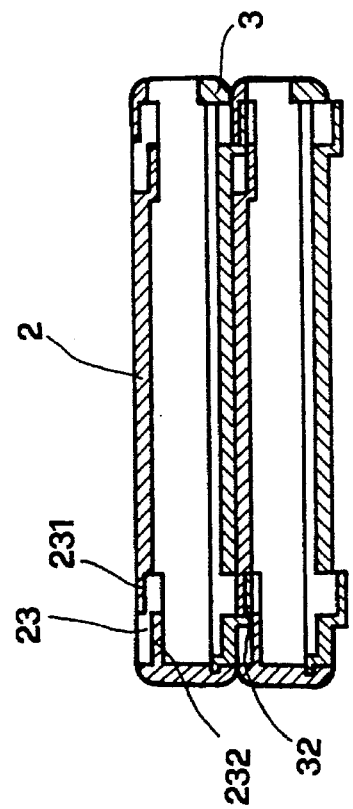
FIG. 6 is a sectional view showing the connecting status of two combined minidisc boxes of this invention.
Figure 5:
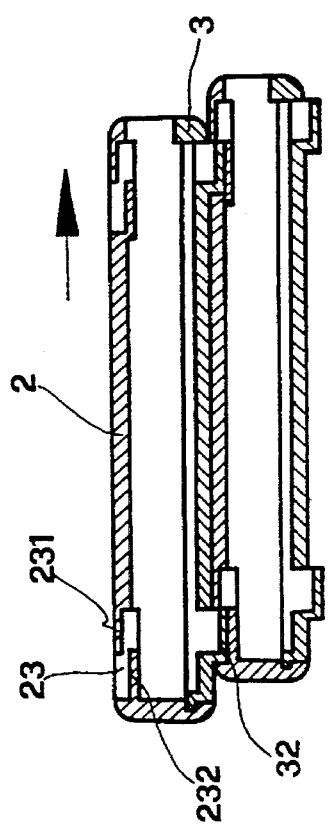
FIG. 5 is a sectional view showing the connecting action of two combined minidisc boxes of this invention.

The flanges (31) (31') of the lower case (3) can be slided into the grooves (21) (21') of the upper case (2) so as to connect the upper case (2) and the lower case (3), the two continuous interval dovetails and dovetail slots (221) (222) and (221') (222') can be fitted respectively with one side of the continuous interval dovetail slots and dovetails of other combined mindisc boxes, furthermore each fitting post (32) of the lower case (3) can be inserted into the front part of each fitting hole (23) of the upper case (2), then each fitting post (32) can be pushed into the rear part of each fitting hole (23) to make he concave part (321) of each fitting post (32) fitted with the first fixing plate (231) of each fitting hole (23) meanwhile the rear part of each fitting post (32) be stopped by means of the second fixing plates (232) such as shown in FIG. 5 and FIG. 6.

Figure 7:
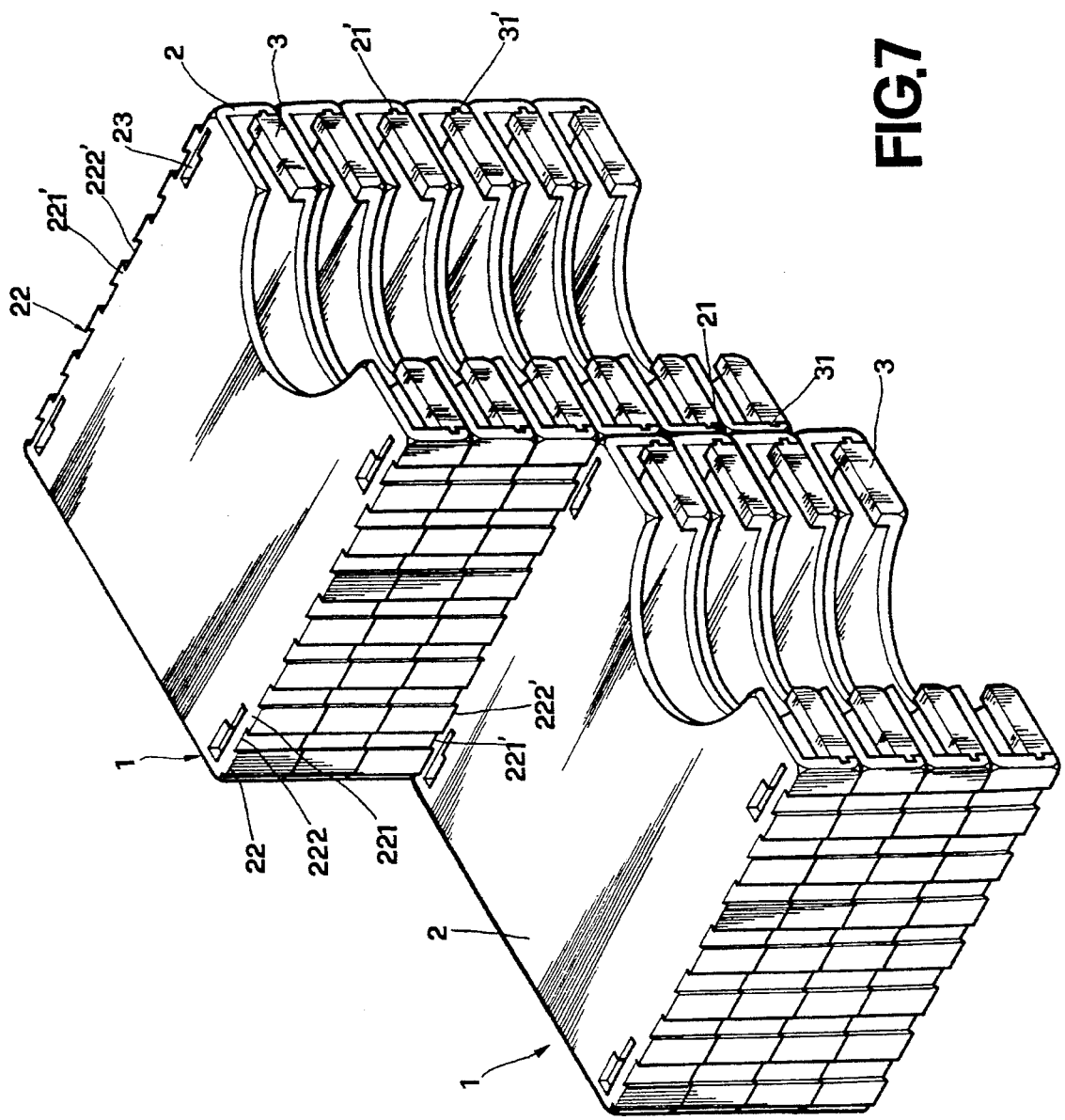
FIG. 7 is a perspective view showing the preferred embodiment of this invention.

Accordingly, the combined minidisc box (1) can be connected with each other on its top, bottom, left and and right side such as shown in FIG. 7.

It is understood by those who skilled in the art that the foregoing description is a preferred embodiment of the disclosed device and that various changes and modifications may be made in the invention without departing from the spirit and scope thereof.

What is claimed is:

1. A combined minidisc box comprising:

an upper case comprising: two tuner sides having grooves, two outer sides having continuous interval dovetails and dovetail slots, the dovetails and dovetail slots of one side being faced to each dovetail slot and dovetail, respectively, of the other side, and four fitting holes each comprising a front part, a first fixing plate and a second fixing plate;

a lower case comprising: two outer sides having flanges which can be slid into said grooves of said upper case to connect said lower case with said upper case, four fitting posts, each defined by a concave part and a rear part, located on the bottom of said lower case which are situated opposite to the fitting holes of the upper case;

the combined minidisc box characterized in that:

said two continuous interval dovetails and dovetail slots of said combined minidisc box are able to be fitted respectively with the continuous interval dovetail slots and dovetails of the other like structured combined minidisc boxed;

furthermore said fitting posts of said lower case can be inserted into the front part of said fitting holes, defined by said first fixing plate, of the upper case of other like structured combined minidisc boxes, and said fitting posts are further able to be pushed into the rear part of said fitting holes, defined by said second fixing plate, so as to make said concave part of each of said fitting posts fit with said first fixing plate of each of said fixing holes, meanwhile said rear part of each of said fitting posts being stopped by means of said second fixing plate;

therefore, a plurality of said combined minidisc boxes can be connected with each other on their top, bottom, left side and right sides.

* * * * *